United States Patent [19]
Tillery, Jr. et al.

[11] Patent Number: 6,032,201
[45] Date of Patent: Feb. 29, 2000

[54] PLUG AND PLAY SYSTEM USING PROXY FOR RETRIEVING CORRECT INFORMATION ABOUT CURRENT DEVICE FROM SYSTEM REGISTRY WHEN CURRENT DEVICE IS NOT THE NEWLY INSTALLED DEVICE

[75] Inventors: Donald Richard Tillery, Jr., Frisco; Michael Andrew Yonker, Plano; Ryan Vaughn Bissell, Dallas, all of Tex.

[73] Assignee: Cirrus Logic, Inc., Fremont, Calif.

[21] Appl. No.: 08/878,936

[22] Filed: Jun. 19, 1997

[51] Int. Cl.[7] .................................................. G06F 15/177
[52] U.S. Cl. .................................. 710/8; 710/10; 710/13
[58] Field of Search ...................... 710/8, 10, 13

[56] References Cited

U.S. PATENT DOCUMENTS

| | | | |
|---|---|---|---|
| 5,412,798 | 5/1995 | Garney | 713/1 |
| 5,481,721 | 1/1996 | Serlet et al. | 709/303 |
| 5,634,074 | 5/1997 | Devon et al. | 710/8 |
| 5,668,996 | 9/1997 | Radinsky | 709/301 |
| 5,748,980 | 5/1998 | Lipe et al. | 710/8 |
| 5,812,820 | 9/1998 | Loram | 395/500.41 |

*Primary Examiner*—Albert De Cady
*Assistant Examiner*—David Ton
*Attorney, Agent, or Firm*—Fulbright & Jaworski L.L.P.; Steven A. Shaw

[57] ABSTRACT

The inventive system provides the correct device driver name about a currently installed device to a software program. The system works with the Microsoft® Windows® plug and play capable operating system. The system uses the system registry, has device information about every device which has ever been installed on the system to provide the driver name. The SYSTEM.INI is not updated by the plug and play subsystem, such that if a previously installed device is reinstalled, the SYSTEM.INI file is not updated, and hence it will hold invalid information. The inventive system substitutes a reference to a proxy in place of the invalid information in the SYSTEM.INI file. Thus, when the program queries the system file for information about the device driver, it instead activates the proxy, which in turn supplies a reference to the correct device driver by using the configuration manager program to scan the system registry to locate the correct driver.

20 Claims, 2 Drawing Sheets

PLUG AND PLAY SYSTEM USING PROXY FOR RETRIEVING CORRECT INFORMATION ABOUT CURRENT DEVICE FROM SYSTEM REGISTRY WHEN CURRENT DEVICE IS NOT THE NEWLY INSTALLED DEVICE

BACKGROUND OF THE INVENTION

In plug and play systems using the Microsoft® Windows® operating system with plug and play capability, a problem arises in re-installing previously installed cards that use the Video Port Manager (VPM™) and were subsequently removed.

For example, a user purchases a new video card and installs the card into the computer. During the installation process, the old video card, which also uses VPM™, is removed, however, the old drivers remain in the system. The system keeps track of the drivers in the system registry. The plug and play system notes the installation of the new card and requests the drivers for the new card. The user inserts the installation disk, which provides the instructions on configuring the drivers within the system so that a software client (or program) can use those drivers, and thus, use the new card. The installation process also inserts VPM™ information in accordance with the VPM™ specification into the Windows SYSTEM.INI file, so that software clients will know where to look for the VPM™ driver.

Thus, when only new and different cards are installed, VPM™'s specified way of retrieving the driver information works with the plug and play system. However, if the user should remove the new video card, and re-install an old and previously installed video card, problems will arise. During the installation process of the old video card, the plug and play system will consult the system registry and realize that the system knows this card and already has the drivers for the card. Consequently, the system does not require loading of the drivers via the installation disk. But most importantly, the installation process does not replace the Windows SYSTEM.INI file entry for VPM™ because this file is not part of the plug and play subsystem. Thus, SYSTEM.INI file contains the instruction line for the new card and not the re-installed old card. Therefore, software clients will not run the correct drivers for the old card.

The result is that the client would obtain the driver for the new card and attempt to access the re-installed old card using the incorrect driver. If the driver is incompatible with the card, then, in the worst case, the system will crash, or in the best case, the card will operate erroneously. This will occur with other types of devices in addition to video cards.

Therefore, it is desired to have the client obtain the correct interface for the actual device which is in use even though the devices have been changed.

SUMMARY OF THE INVENTION

The invention solves this and other problems. The invention is a system that is installed in such a way so that the software client obtains the correct interface driver for the actual, installed hardware card. Thus, if the user installs a new device, and then reverts back to the original device, the system will recognize that the installed device is the original device, and appropriately reconfigure itself. So when the software client accesses the driver through the invention, the client receives the original driver rather than the second driver for the now uninstalled device.

The invention, through the system, obtains the current device and reads the system registry and then determines if any information about the device is stored therein. If the invention locates the device in the registry, the information about the stored device is retrieved therefrom. However, for compatibility, the software client will still go to the first location that was originally specified in the VPM™ specification, but instead of reading a reference to an incorrect location, the client reads a reference to the invention, which in turn will retrieve the correct information. The invention acts as a proxy for existing clients that are not aware of the plug and play system.

Microsoftt® has developed the plug-and-play concept, and the invention uses the features of Windows® 95 plug-and-play configuration manager to write the file name of the proxy to the SYSTEM.INI file so that legacy software clients can continue to request the information in the same manner, but the proxy retrieves the correct information and provides it back to these legacy clients.

It is one technical advantage of this invention that the system user can more easily install and uninstall devices on their machine without having conflicts between drivers and hardware.

Another technical advantage of this invention is that the drivers would automatically be enabled for the proper hardware. Prior to the invention, the user was required to manually edit the SYSTEM.INI file to correct the device information contained therein.

A further technical advantage of this invention is that the implementation of the invention is compatible with existing software applications. Thus, the plug-and-play functionality, which is actually obtained through the configuration manager and the system registry, does not require changes to existing software clients.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 6:
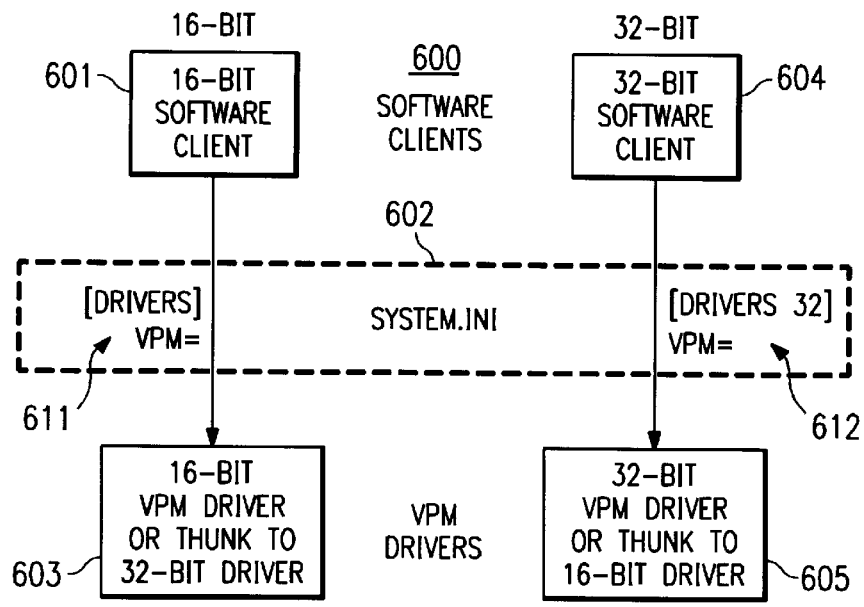
FIG. 6 is a schematic view of the configuration for the prior art system.

Before beginning the discussion of the invention, it is helpful to review the prior art configuration as represented in FIG. 6.

The system 600 of FIG. 6 includes 16 bit software client 601. Client 601 is either another driver, or the actual application or software program. If client 601 is a driver, then the user application would open it, but regardless, client 601 is the piece that will communicate with driver 603 for the hardware. Client 601 opens the SYSTEM.INI file 602. The SYSTEM.INI is a file in the Microsoft® Windows® system that has system information stored therein, and this file would normally be opened via system Application Programming Interfaces (APIs) which are standard function calls provided by the operation system. Client 601, via an API such as GetPrivateProfileString( ), would obtain the name of the driver file, which is the 16 bit VPM™ driver or the thunk to 32 bit VPM™ driver 603. The name of that file would be on the line in SYSTEM.INI file 602 called "VPM=". VPM™ is the Video Port Manager Interface that Cirrus Logic® defined for control of the video port and video window portions of a VGA chip.

In Drivers section 611 of SYSTEM.INI file 602 is the path to the 16 bit version of driver 603 in the "VPM=" line. Once the client obtains the file name, it then does another API call Load library( ) to open that driver and begins to use that driver as defined by the VPM™ specification. For the 32 bit software client 604, client 604 would obtain the name of the 32 bit VPM driver or thunk to 16 bit VPM™ driver 605 from the "VPM=" line in the SYSTEM.INI file 602 in Drivers 32 section 612 of the file. The client 604 would then use that name in a call to Load library( ), and once the library was loaded, then use the driver as defined in the VPM specification.

As specified in the VPM specification, the VPM driver contains a plurality of function names, each one of them, when called, executes a particular procedure for controlling the associated video port hardware. All VPM drivers present the same functions, but each controls a different piece of video port hardware. The "VPM=" line must specify the correct VPM driver for the currently installed hardware. The VPM manager is used for example purposes only. In this same SYSTEM.INI file 602 there are a number of other entries to different types of drivers as well as other information with which the invention would also work.

The following is an example of how a software client relates to a driver in the prior art Windows architecture shown in FIG. 6. A good example of a software client would be a spreadsheet application, such as Excel. Excel performs several tasks that would require direct access to the hardware, one of which is printing the spreadsheet. Most software clients do not know how to communicate directly with a printer. The clients have to use a driver to communicate with the printer. In that regard, the Excel is called a "software client" because it is a client of a driver and that it is using the driver as a means to an end, in this case, printing.

Figure 2:
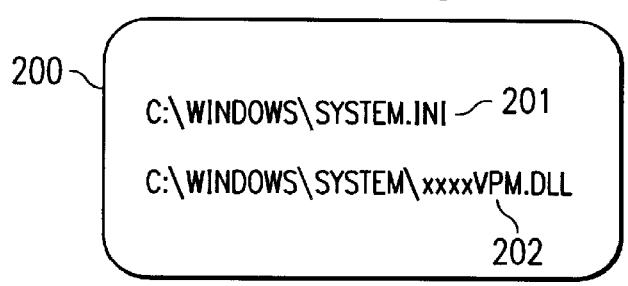
FIG. 2 depicts the system path to the SYSTEM.INI file in a Windows installation that uses the C:\ drive as the basic drive for storing informaton.
Figure 3:
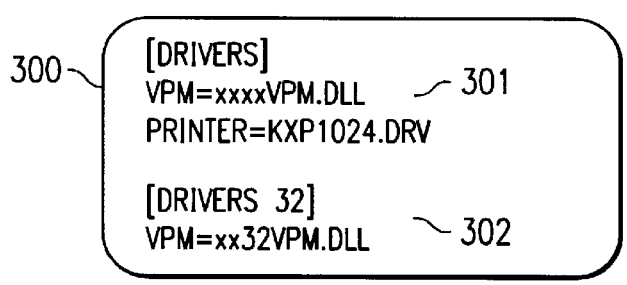
FIG. 3 depicts lines in the SYSTEM.INI file.

The software client locates the name of the driver that it needs to use via the SYSTEM.INI file 300, where the names of the appropriate drivers for each type of hardware are logged. FIG. 2, Line 201 shows a typical Windows path to the SYSTEM.INI file using the C: drive as the basic drive for storing information. Directory WINDOWS would contain the file, SYSTEM.INI. The software client would open the SYSTEM.INI which is located in the path 201 of FIG. 2. A sample portion of the contents of SYSTEM.INI file 300 are shown in FIG. 3. The SYSTEM.INI 300 includes Drivers section 301 and Drivers 32 section 302. A 16 bit software client will read the line under Drivers section 301 that is labeled PRINTER= and as indicated to the right of the PRINTER= label, the client will retrieve the file name of the printer driver. The printer driver path name 202 appears as shown in FIG. 2 with the exception that the xxxxVPM.DLL actually comes from the SYSTEM.INI as illustrated in FIG. 3 and would be replaced with KXP1024.DRV for the Excel printer example. The 32 bit software client would instead read the Drivers 32 section 302 in FIG. 3 and retrieve the indicated file for its entry point into the driver. Note that this file may be the same file in Drivers section 301, but typically is a different file. Excel would then issue standard function calls to the printer driver which would convert them to the appropriate commands to the printer to achieve the desired results. All printer drivers must have the same standard functions, so that all printers print the same results.

Figure 4:
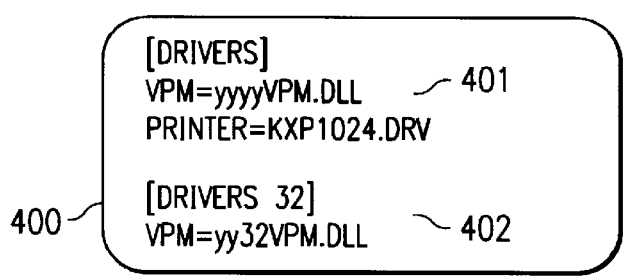
FIG. 4 depicts lines in the SYSTEM.INI file.

The problem as described in the Background section, occurs when the user actually installs drivers for some hardware. For example, FIG. 3 depicts the SYSTEM.INI file when the old video card is installed, and FIG. 4 depicts the SYSTEM.INI file when the old video card has been removed and the new video card has been installed. As stated in the Background section, when a new and unknown video card is installed during the installation process, the VPM=line in SYSTEM.INI file is changed from that shown in FIG. 3 to that shown in FIG. 4, so that a software client will know which driver to load. However, if the user re-installs the old video card, the system does not amend the SYSTEM.INI file back to what is shown in FIG. 3, but remains as shown in FIG. 4. This is because the system will recognize the old card via the system registry, and know that the system still has the drivers for the old card, and consequently, will not request the insertion of the installation disk, and thus it will not re-configure itself. Moreover, the SYSTEM.INI file is not part of the plug and play subsystem, so, the VPM=line in the SYSTEM.INI file is not changed back to its original format. As stated in the Background section, this condition can lead to serious problems with the system, because the software client will receive the wrong driver information.

The purpose of this invention is to allow the software client to receive the correct driver information, by always providing the client with the correct information, not outdated information. Although, the previous example is in the context of where one card is being replaced by another card and then reverting back to the original card, this invention will also work where multiple pieces of hardware are being added to the system simultaneously to provide enhanced services.

Figure 1:
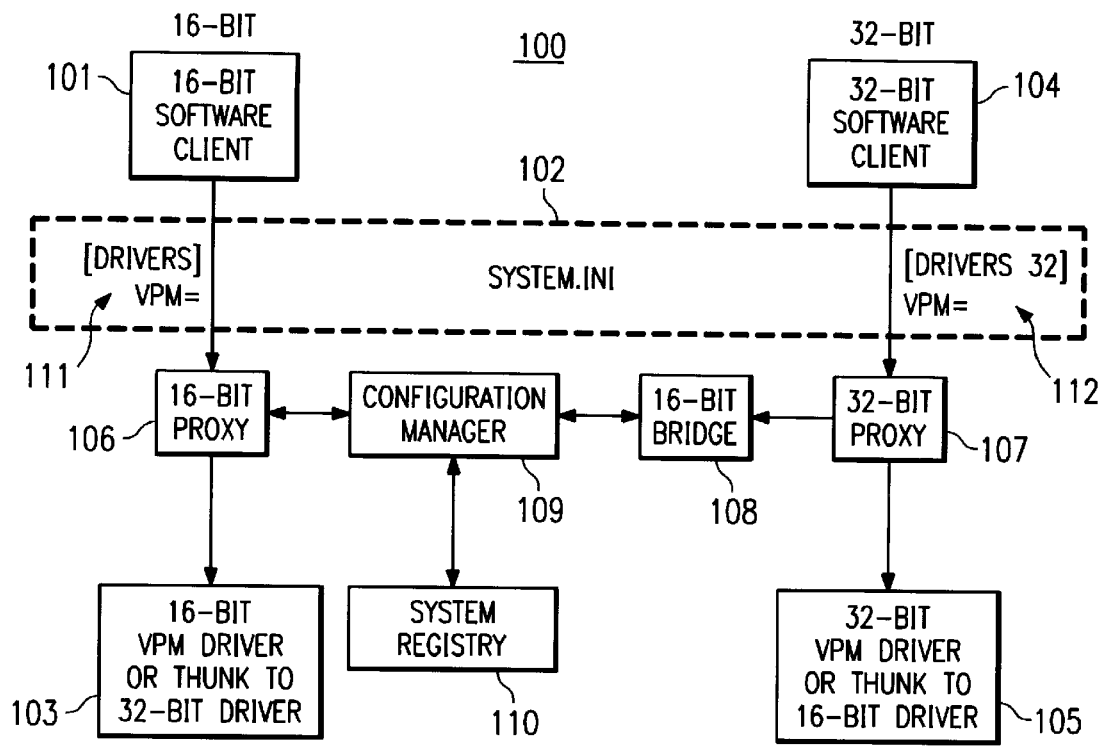
FIG. 1 is a schematic view of the configuration for the inventive system.
Figure 5:
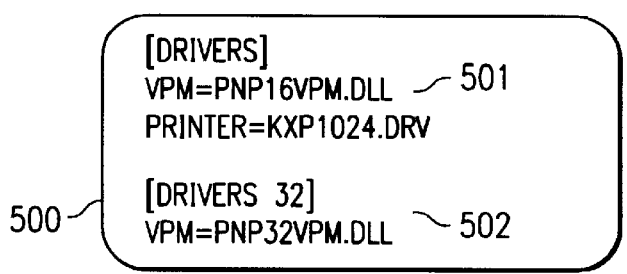
FIG. 5 depicts lines in the SYSTEM.INI file.

The invention is to insert proxies between the software client and the driver or thunk layers, as shown in FIG. 1. Several elements shown in FIG. 1 are similar to those in FIG. 6, and these elements have received similar identifying labels, e.g. the 16 bit software client is labeled 101 and 601, respectively. The invention uses 16 bit proxy 106, 32 bit proxy 107, and 16 bit bridge 108. When the 16 bit software client 101 opens SYSTEM.INI file 102, client 101 still goes to Drivers section 111 and looks for the VPM=entry for compatibility, but instead of having the file name of 16 bit VPM driver 103, it instead has the name of 16 bit proxy 106 as shown in FIG. 5. This is an example name 501 for 16 bit proxy.

The 16 bit proxy 106 actually goes through the standard Windows® plug and play interface for obtaining the correct name of the 16 bit VPM driver thunk layer 103. The correct driver is stored in the system registry, which is differently designed, but serves a similar purpose as the SYSTEM.INI file. The driver that the proxy obtains via the system registry file will be associated with the actual current piece of hardware installed in the system, because the system registry knows that the original card was reinstalled. Therefore, the original information is at a particular location in the system registry. The system registry contains all of the plug-and-play information for every card and device ever installed on the system. When the system recognizes that a card has been installed, it looks into the system registry to see whether the card is recognized. If it is not recognized, the system asks for the installation disk as previously discussed.

Once the system receives the installation information, the system stores that information in the system registry forever. If a second, new card is installed, the system again looks at the system registry, performs the installation, and stores that in the system registry, but retains the information from the first card. If the first card is re-installed, the system looks at the system registry and recognizes that it already has information about this card, and it reverts back to the previous information. The plug and play system does not make any subsequent changes to the SYSTEM.INI file, but it does make changes to the system registry.

So by using the proxy, the system actually uses the existing plug-and-play mechanism that is present in system registry 110. Software client 101 loads 16 bit proxy 106. Client 101 receives the name of the actual 16 bit VPM driver (or thunk layer) 103. The 16 bit proxy 106 knows that correct VPM driver 103 for the installed device is in the system registry. Proxy 106 uses Window's Configuration Manager 109 to access the system registry 110. Configuration Manager 109 queries registry 110 for the current device type and its associated information. This way, the software client always receives the correct information for the current device, not just the last new one installed.

Another requirement is that in 32 bit side, 32 bit software client 104 will go to Drivers section 112 and open 32 bit proxy 107. However, 32 bit proxy 107 must open bridge 108 to access Configuration Manager 109, which then can get the driver information, and return it to 32 bit proxy 107. Then 32 bit client 104 can load 32 bit VPM driver 105.

Although the present invention and its advantages have been described in detail, it should be understood that various changes, substitutions and alterations can be made herein without departing from the spirit and scope of the invention as defined by the appended claims.

What is claimed is:

1. An apparatus for providing access to a correct device driver about a current device to a software program, the current device being installed on a computer system that uses a graphical user interface program, the apparatus comprising:
a system registry having device driver information about substantially all devices having been installed on the system;
a system file intended to have device driver information about a newly installed device; and
a proxy that supplies a reference to the correct device driver to the software program by using a configuration manager program to scan the system registry to locate the driver for the current device;
wherein the information in the system file about the newly installed device has been replaced with a reference to the proxy prior to operation of the software program; and
the proxy is activated when the program queries the system file for information about the newly installed device.

2. The apparatus of claim 1, wherein the software program is a 16 bit program, and the proxy is a 16 bit proxy.

3. The apparatus of claim 1, wherein the software program is a 32 bit program, and the proxy is a 32 bit proxy.

4. The apparatus of claim 3, wherein:
the 32 bit proxy uses a bridge to open the configuration manager program.

5. The apparatus of claim 1, wherein:
the current device is selected from the group consisting of: video card, sound card, CD ROM drive, mouse, keyboard, floppy drive, SCSI card, printer, modem, network card, tape drive, page scanner, touch pad, joy stick, pointing stick, touch screen, magneto-optical drive, hard drive, microphone, speaker, still camera, video camera, and trackball.

6. The apparatus of claim 1, wherein:
the newly installed device and the current device are both presently installed in the system.

7. The apparatus of claim 1, wherein:
the newly installed device is no longer installed in the system, and the current device is presently installed in the system.

8. The apparatus of claim 7, wherein:
the information in the system registry is changed to reflect that the newly installed device is no longer installed and the current device is installed in the system.

9. The apparatus of claim 7, wherein:
the information in the system file is not changed to reflect that the newly installed device is no longer installed and the current device is installed in the system.

10. A method for providing correct information to a software program about a current device installed on a computer system, the method comprising the steps of:
providing a system file intended to have information about a newly installed device;
providing a system registry having information about substantially all devices having been installed on the system;
replacing the information in the system file with a reference to a proxy; and
retrieving information, via the proxy, from the system registry and supplying the information to the program.

11. The method of claim 10, further comprising the step of:
activating the proxy by the program querying the system file for information about the newly installed device.

12. The method of claim 11, further comprising the step of:
invoking a configuration manager program to scan the system registry to locate the driver for the current device;
wherein the configuration manager is invoked by the proxy.

13. The method of claim 10, wherein the software program is a 16 bit program, and the proxy is a 16 bit proxy.

14. The method of claim 10, wherein the software program is a 32 bit program, and the proxy is a 32 bit proxy.

15. The method of claim 14, further comprising the step of:
using, by the 32 bit proxy, a 16-bit bridge to open the configuration manager program.

16. The method of claim 10 wherein:
the current device is selected from the group consisting of: video card, sound card, CD ROM drive, mouse, keyboard, floppy drive, SCSI card, printer, modem, network card, tape drive, page scanner, touch pad, joy stick, pointing stick, touch screen, magneto-optical drive, hard drive, microphone, speaker, still camera, video camera, and trackball.

17. The method of claim 10, further comprising the steps of:

installing the current device;
uninstalling the current device;
installing the newly installed device;
uninstalling the newly installed device; and
reinstalling the current device.

18. The method of claim 17, further comprising the steps of:

amending the information in the system registry to reflect that the newly installed device is no longer installed and the current device is installed in the system; and
maintaining unchanged the information in the system file system.

19. The method of claim 10, further comprising the steps of:

installing the current device; and
installing the newly installed device.

20. The method of claim 19, further comprising the steps of:

amending the information in the system registry to reflect that both the newly installed device and the current device are presently installed in the system.

* * * * *